Jan. 4, 1955  W. E. SEGL  2,698,789
METHOD FOR THE DIGESTION OF CELLULOSE-BEARING MATERIAL
Filed Feb. 8, 1954
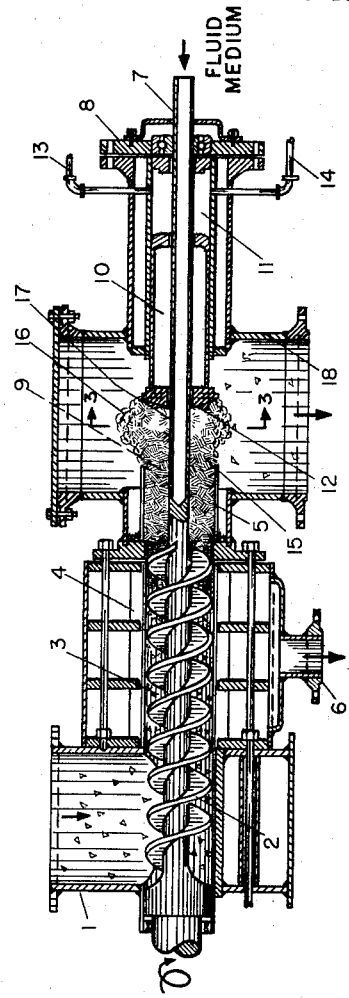
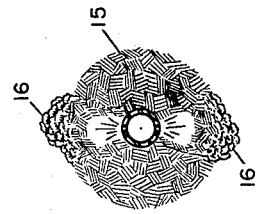
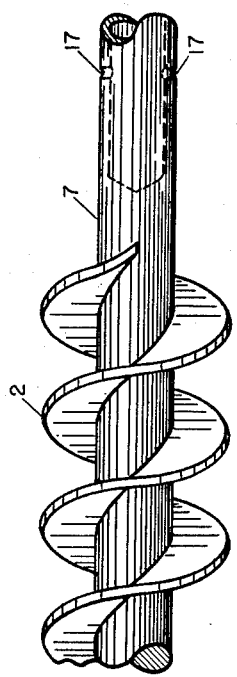
WALTER E. SEGL
INVENTOR.
BY  *Ernest G. Peterson*
AGENT.

United States Patent Office 2,698,789
Patented Jan. 4, 1955

2,698,789

METHOD FOR THE DIGESTION OF CELLULOSE-BEARING MATERIAL

Walter E. Segl, Wilmington, Del., assignor to Hercules Powder Company, Wilmington, Del., a corporation of Delaware Application February 8, 1954, Serial No. 408,677

11 Claims. (Cl. 92—6)

This invention relates to the purification of cellulose-bearing materials and more particularly to improvements in the art for charging and discharging such cellulosic material into and from continuous processing equipment.

In the production of purified cellulose suitable for the many fields in which cellulose is used, and especially for the preparation of cellulose derivatives, a high quality of end product is required as well as high capacity production. The latter requires continuous processing technique wherein the processing zone or zones are maintained at a pressure other than atmospheric and usually superatmospheric. Accordingly, it is necessary to maintain a pressure-resistant compact or plug of the material being continuously charged into the processing zone and, in many instances, it is desirable to maintain such a compact or plug for discharge of processed material from the processing zone. However, it is very necessary to disintegrate the pressure-resistant compact or plug so that processing medium employed in the processing zone can effectively contact the cellulosic material being processed to impart thereto certain desired physical and chemical effect. Although numerous processes and types of apparatus exist for continuously forming a pressure-resistant compact and charging material therefrom into or from a pressurized treatment zone, the problem in handling a cellulosic material is considerably more difficult. This is due to the fact that cellulosic materials after being formed into a compact tend to retain knots and lumps unless very effectively disintegrated. For example, a cotton linters compact when extruded against an apex or conical surface for disintegration breaks into masses containing knots and lumps. Unless these knots and lumps are further disintegrated by some effective auxiliary means, the purified cellulose obtained therefrom contains a high "pill count" which makes the cellulose unsuitable for many usses unless further processed or blended with high quality material.

Therefore, the principal object of this invention is to provide an improved method for forming and disintegrating a pressure-resistant compact of cellulosic material which is substantially free from knots and lumps.

Another object of this invention is to provide an improved method for very effectively disintegrating a pressure-resistant compact of cellulosic material which is simple, economical, reliable and gives uniformity in operation.

Other objects of the invention will appear hereinafter, the novel features and combinations being set forth in the appended claims.

Generally described, in accordance with this invention there is provided a method for forming and disintegrating a pressure-resistant compact of cellulosic material which comprises continuously forming a pressure-resistant compact of cellulosic material in a compression zone; continuously extruding the pressure-resistant compact from the compression zone in the form of an annular body; and disintegrating the annular body being continuously extruded from the compression zone by expulsion of fluid medium from within said body.

In the accompanying drawings, which form a part of the specification, and wherein reference symbols refer to like parts whereever they occur:

Fig. 1 is a diagrammatic, sectional view of a preferred form of apparatus for practice of the invention;

Fig. 2 is an enlarged, fragmentary, elevational view of the double-flight screw depicted in Fig. 1; and Fig. 3 is an enlarged, sectional view showing disintegration of two radial segments of extruded cellulosic material and is taken along line 3—3 of Fig. 1.

In accordance with the preferred form of the invention, wetted cellulosic material, such as cotton linters, is charged through a conduit 1 which is in communication with a driven double-flight screw 2. The screw 2 gathers the cellulosic material and passes it into a compression zone 3 which includes a bar cage arrangement 4 and a forming tube 5. As the material is compressed in the compression zone 3, it is formed into a pressure-resistant compact and any excess liquid in the cellulosic material is expelled and passes through openings in the bar cage arrangement 4 and is withdrawn through a conduit 6. As the material is further progressed by the screw 2, it is still further compressed and is forced along the extended shaft 7 of the screw 2. The extended shaft 7 has a journal assembly 8 for suitable support of the shaft at the end opposite the screw flight and substantially the entire extended portion of the shaft is hollow. The egress end of the forming tube 5 is provided with a seat 9 for a pressure-actuated check ram 10 which is concentric with the shaft 7 and which is operated by controlled fluid medium, such as hydraulic fluid, supplied to a pressure cylinder 11. As the screw 2 continues to rotate, the cellulosic material is extruded from the forming tube 5 in the form of a supported annular body and moves along the shaft 7 thereby providing a linear body of supported annular material between the end of the forming tube 5 and the face 12 of the ram 10. The ram 10 is suitably splined to the cylinder 11 to prevent rotation of the ram with the screw shaft 7. The pressure on the ram 10 is regulated by passing hydraulic fluid to and from the cylinder 11 by means of lines 13 and 14, respectively. During start up, the ram 10 is pressure actuated to assist in initial formation of the pressure-resistant compact. During continuous operation the ram is not pressure actuated but takes an idle position such as shown in Fig. 1. However, in the event the pressure-resistant compact of the material fails within the compression zone 3, the ram 10 is immediately pressure actuated and moves forward and the face 12 thereof engages the seat 9 thereby preventing a blow-back. Means for activating and deactivating the pressure-actuated ram 10 have not been shown, since there are numerous ways of doing this and they are well within the province of persons skilled in the art. However, a particularly efficacious system for controlling the ram resides in controlling it from the power requirement of the motor driving the screw 2. A sudden drop in the power requirement for the screw 2 immediately indicates failure of the compact at which time the ram is immediately activated through suitable valve mechanism and is thrust to its seat to prevent a blow-back. Conversely, as the power requirement for the screw returns to normal operating range, the ram is deactivated.

In normal continuous operation as the screw 2 continues to rotate, the linear annular body of material, represented by 15, between the forming tube 5 and the ram 10 has its end portion continuously disintegrated by the blowing of radial segments, represented by 16, therefrom. This is accomplished by flowing fluid medium, such as steam, under pressure through the hollow portion of the shaft 7 and providing apertures 17 for emergence of the fluid medium from within the annular body of material. In accordance with this preferred embodiment of the invention, the apertures 17 are opposed and as the screw 2 continues to rotate the linear body of material is continuously built up and two radial segments thereof are continuously disintegrated. Disintegration in this manner is very thorough and effective and the cellulosic material thus disintegrated is passed through a conduit 18 and, for example, into suitable digestion equipment.

It has been found, generally, that either a single-flight or double-flight screw having a diameter in the order of 12 inches and a total flight length in the order of 5 feet gives very satisfactory results. With such an arrangement, approximately the first 2 feet of the flight length is used for inlet with the remainder of the flight length disposed within the bar cage. A radial bar cage is preferred with openings between the bars in the order of about 0.050 inch and a suitable length for the forming tube is in the order of length equivalent to the diameter of the screw. The ram face may be flat but it is preferable to have a slight convex surface for the face thereof to provide a better seal in the event of a blow-back. The pressure on the ram when activated for use may be varied to control the rapidity of thrust to its seat. Ordinarily, a pressure differential in excess of 10 p. s. i. g. is adequate for this purpose. The length of the annular body maintained between the forming tube and the face of the ram is between from about 6 to about 15 inches.

It will be appreciated that in accordance with this invention, one aperture or a plurality of apertures may be used to effect disintegration. These may vary in size from about 1/8 to about 1/2 inch in diameter. Furthermore, the apertures may be radially disposed as, for example, using four wherein substantially circumferential disintegration of the body of material is attained, or the apertures may be lineally disposed wherein a substantially linear and radial segment of the body of material is disintegrated, or a combination of these. Generally, it is preferable to have one or more of the apertures in radial alignment with injection of the fluid medium under sufficient differential pressure to give strong expulsion of the medium. The actual pressure used for the fluid medium will depend on such factors as: diameter of the cellulosic body; type of material; extent of consolidation and the like. In all cases, however, the expulsion of fluid medium is governed to impart sufficient impact on the body of cellulosic material to give thorough and effective disintegration as it is blown therefrom. The fluid medium may be gaseous, such as steam, or it may be liquid, such as digestion chemical and it may be used in whole or in part in meeting the fluid medium requirements of subsequent processing. Additionally, the pressure on the fluid medium may be maintained continuous or it may be applied intermittently to give a pulsating effect. Furthermore, it has been found that the screw flights may be of uniform pitch or variable pitch and give satisfactory results. From the foregoing, it is evident that there are several factors which will influence conditions for the most satisfactory operation of the invention, the actual limits of which can be determined only by consideration of the starting materials involved and the intermediate and the finished products desired.

In operation of the invention for a continuous system, the cellulosic starting material is subjected to the usual preparation treatment. For example, wood, straw, and other bulk cellulose-containing materials are reduced to chips or shreds and screened. Preferably, the chips or like material to be treated will have at least one thickness in the order of 1/4 inch and will pass a 3/4-inch mesh screen. Raw linters and similar fibrous cellulosic material are simply subjected to the usual bale opening facilities. Ground wood pulp or chemical wood pulp may be used without additional preparation where in the former instance substantially complete digestion is desired and in the latter further digestion treatment for special end product use. The cellulosic starting material after suitable preparation, if necessary, is then weighed by a constant weight feed device and a pretreatment solution of water or water and chemicals is thoroughly mixed with the material in a pretreatment zone. The pretreatment solution may be water to serve as a lubricant for the wetted material, or it may be water and chemicals in which the latter may be acid or alkaline digestion medium, with or without wetting agent, detergent, or other digestion aid or bleaching medium, or like chemical agents. These chemicals may be employed as desired to effect certain desired conditioning prior to actual digestion. It is desirable that an excess of the pretreatment solution be present to insure positive wetting of the material and adequate lubrication. The material from the pretreatment zone is continuously passed into a first compression or compaction zone in accordance with this invention wherein excess pretreatment solution is squeezed from the material as it is formed into a pressure-resistant compact. The material from the compression zone is extruded therefrom in the form of an annular body which forces the ram backwards to its idle position at which point it is deactivated as previously described. The fluid medium under high pressure emerging from the apertures in the screw shaft thus blows radial segments of the end portion of the body of material into fragments. In this manner very effective continuous disintegration of the compacted material is attained and the material thus disintegrated is passed into a digestion zone maintained under conditions of continuous agitation, superatmospheric pressure and temperature. The quantity and type of chemicals used, the pressure and temperature, and length of the digestion period may be varied according to the yield and quality of the cellulose desired. After digestion, the digested material is then passed into a second compression or compaction zone in accordance with this invention wherein excess digestion liquid is squeezed from the digested material as it is formed into a pressure-resistant compact. The material is then disintegrated as hereinbefore described or it may be blown to substantially atmospheric pressure depending upon the type of system employed. The discharged material may then be washed, bleached, sheeted, or bulk dried, or otherwise suitably processed as desired for subsequent use.

In accordance with this invention the raw material may be a cellulose-bearing material such as comminuted wood, for example, wood chip and wood waste, wheat straw, bagasse and other agricultural residues, cotton linters, and pulps requiring further refinement. Furthermore, the method for forming and disintegrating a pressure-resistant compact of such cellulosic materials in accordance with this invention, either for charging into or discharging from a digestion zone, affords certain advantages in conjunction with digestion which represent a marked improvement in the art. For example, the raw material may be defibrated prior to digestion or subsequent to digestion as desired and satisfactorily charged or discharged and disintegrated. The pretreatment liquid may be chemically inert such as water, or may be a chemically active aqueous solution containing chlorine, sodium sulfide and sodium hydroxide, sulfurous acid and a bisulfite, sodium hydroxide and the like. Therefore, the pretreatment liquid may be water per se, or bleach solution such as aqueous hypochlorite, or digestion solution such as aqueous sodium hydroxide. The digestion liquid may be an aqueous solution of any of the chemically active agents hereinbefore referred to for pretreatment depending on the raw material involved. Generally, the quantity and type of chemicals used, the pressure and temperature, and length of the digestion period may be varied according to the yield and quality of the cellulose desired. In accordance with a preferred embodiment of this invention, wherein the raw material is cotton linters, the pretreatment liquid may range from a weak to a strong aqueous solution of caustic alkali, that is, from about 0.5 to about 7% and higher, say, up to 15%, depending on the quality of the starting material and quality of the cellulose desired. The digestion liquor may be an aqueous solution comprising from about 0.5 to about 10% caustic alkali with digestion carried out under a steam pressure from about 25 to about 175 pounds gage per square inch at a temperature from about 266° to about 377° F. In this embodiment, the steam requirement for digestion is supplied through the disintegration apertures in the screw shaft by supplying steam to the screw shaft at a pressure in the order of 25 p. s. i. g. or more above the pressure existing in the digester. During digestion, the ratio of digestion liquor to linters may be maintained from about 1:1 or even less to about 5:1 with satisfactory operation, and from the standpoint of economy the lowest possible liquor to linters ratio, say, approaching a 1:1 ratio, is used. Detergents, wetting agents, and other digestion aids may be added to the digestion liquor or added to the digester to aid in the removal of undesirable material during digestion. Similarly, in the sulfite, soda, and sulfate processes which constitute the major proportion of chemical pulps, conventional digestion chemical and moderants may be utilized in conjunction with this invention with distinct benefit. This is more readily seen in reference to the advantages of the invention. For example, the pretreatment step affords thorough wetting and lubrication for charging the material and may include some chemical action if desired. It has been pointed out above that a low liquor to linters ratio is desirable for economic reasons, and it is possible to use far lower ratios on a commercial basis in accordance with this invention than heretofore possible. One reason for this improvement is the thorough and uniform distribution of a small amount of liquor through the mass of cellulosic material that is accomplished by the action of the charging screw in squeezing out excess liquor followed by thorough and effective disintegration of the mass. Furthermore, due to the very thorough and effective disintegration of the formerly compacted cellulosic material in accordance with this invention, the heat distribution and contact of the material with chemical throughout the digestion step is exceptionally uniform and thorough so that low liquor to cellulose ratios, increased chemical concentration, and reduced time of digestion may be employed. Additionally, chemical concentration may be varied throughout the digestion zone by providing intermediate points for charging dilution or concentration medium to the zone as desired. Excess solution, if present, may be removed from the digested material during discharge so that the chemicals can be recovered or re-used before being diluted with copious amounts of water which entail additional expense in recovery of chemical or concentration for re-use.

Still further, and quite important and advantageous is the ability of the method of this invention to use fluid medium required for subsequent processing as the disintegration vehicle.

It will be seen, therefore, that the advantages of this invention are multifold. The very thorough and effective disintegration of compacted cellulosic material as obtained in accordance with the method of this invention affords great latitude in processing conditions and affords a highly desirable uniform material for charging to digestion equipment. Additionally, upon discharge from such equipment, the method of this invention may be used to properly condition cellulosic material for subsequent treatment including washing, bleaching, defibration, or similar desired aftertreatment procedures.

Although the present invention has been described more particularly in respect to cotton linters with specific details for the digestion of this cellulosic material, it is not intended that these details shall be regarded as limitations upon the scope of the invention since the invention may be employed where chemical reaction is desired such as in esterification and etherification reactions. Therefore, it is not intended that the scope of this invention be limited, except in so far as included in the accompanying claims.

This invention is a continuation-in-part of my copending application, Serial No. 253,521 filed October 27, 1951, now Patent No. 2,673,690, which in turn is a continuation-in-part of my copending application, Serial No. 104,616, filed July 14, 1949.

What I claim and desire to protect by Letters Patent is:

1. The method for forming and disintegrating a pressure-resistant compact of cellulosic material which comprises continuously forming a pressure-resistant compact of cellulosic material in a compression zone; continuously extruding the pressure-resistant compact from the compression zone in the form of an annular body; and disintegrating the annular body being continuously extruded from the compression zone by expulsion of fluid medium from within said body.

2. The method for forming and disintegrating a pressure-resistant compact of cellulosic material which comprises continuously forming a pressure-resistant compact of cellulosic material in a compression zone; continuously extruding the pressure-resistant compact from the compression zone in the form of an annular body; and continuously disintegrating at least one substantially radial segment of the body being continuously extruded from the compression zone by expulsion of fluid medium from within said body.

3. The method for forming and disintegrating a pressure-resistant compact of cellulosic material which comprises continuously forming a pressure-resistant compact of cellulosic material containing liquid in a compression zone; continuously extruding the pressure-resistant compact from the compression zone in the form of an annular body; and continuously disintegrating at least one substantially radial segment of the body being continuously extruded from the compression zone by expulsion of fluid medium from within said body.

4. The method for forming and disintegrating a pressure-resistant compact of cellulosic material which comprises continuously forming a pressure-resistant compact of cellulosic material containing liquid in a compression zone and removing any excess liquid therefrom in said zone; continuously extruding the pressure-resistant compact from the compression zone in the form of an annular body; and continuously disintegrating at least one substantially radial segment of the body being continuously extruded from the compression zone by expulsion of fluid medium from within said body.

5. The method for forming and disintegrating a pressure-resistant compact of cellulosic material which comprises continuously forming a pressure-resistant compact of cellulosic material containing liquid in a compression zone and removing any excess liquid therefrom in said zone; continuously extruding the pressure-resistant compact from the compression zone in the form of a supported annular body; and continuously disintegrating at least one substantially radial segment of the body being continuously extruded from the compression zone by expulsion of fluid medium from within said body.

6. The method for forming and disintegrating a pressure-resistant compact of cellulosic material which comprises continuously forming a pressure-resistant compact of cellulosic material containing liquid in a compression zone and removing any excess liquid therefrom in said zone; continuously extruding the pressure-resistant compact from the compression zone in the form of a supported annular body; and continuously disintegrating a plurality of substantially radial segments of the body being continuously extruded from the compression zone by expulsion of fluid medium from within said body.

7. The method in accordance with claim 4 in which the cellulosic material is cotton linters.

8. The method in accordance with claim 4 in which the cellulosic material is comminuted wood.

9. The method in accordance with claim 4 in which the cellulosic material is wheat straw.

10. The method in accordance with claim 4 in which the cellulosic material is bagasse.

11. The method in accordance with claim 4 in which the cellulosic material is pulp requiring further refinement.

References Cited in the file of this patent

UNITED STATES PATENTS 1,048,853   Muntzing _____ Dec. 31, 1912